United States Patent [19]

Napoli et al.

[11] 4,041,307

[45] Aug. 9, 1977

[54] POSITIONING A PLATFORM WITH RESPECT TO RAYS OF A LIGHT SOURCE

[75] Inventors: Louis Sebastian Napoli, Hamilton Square; Richard Everet Marx, Jamesburg, both of N.J.

[73] Assignee: RCA Corporation, New York, N.Y.

[21] Appl. No.: 694,044

[22] Filed: June 7, 1976

[51] Int. Cl.² ............................................. G01J 1/20
[52] U.S. Cl. .............................. 250/203 R; 250/209; 250/237 R; 126/270
[58] Field of Search ............... 250/203, 209, 237; 126/270, 271; 356/141, 152

[56] References Cited

U.S. PATENT DOCUMENTS

| | | | |
|---|---|---|---|
| 2,954,608 | 10/1960 | Lawlor | 250/203 R X |
| 2,956,170 | 10/1960 | Sibley | 250/203 R |
| 3,996,917 | 12/1976 | Trihey | 126/270 |

Primary Examiner—Rudolph V. Rolinec
Assistant Examiner—Vincent J. Sunderdick

Attorney, Agent, or Firm—Edward J. Norton; Leonard Weiss

[57] ABSTRACT

An opaque open-ended cylindrical tube, with a flange on one end, has its other end connected to a surface of a platform with the axis of the cylinder normal to the surface. When rays of the sun are substantially normal to the surface, a lens causes a concentrted illumination of a group of tracking photocells carried on the surface within the cylinder. In response to the concentrated illumination, the tracking photocells provide signals that cause the platform to rotate in a direction that maintains the surface substantially normal to the rays of the sun. Additionally, outside of the cylinder and adjacent thereto, a group of acquisition photocells are shielded by the flange from the sun when the rays thereof are substantially normal to the surface. When there is a large angle between a normal to the surface and the rays of the sun, the acquisition photocells provide signals that cause the platform to rotate in a direction that reduces the angle.

5 Claims, 3 Drawing Figures

POSITIONING A PLATFORM WITH RESPECT TO RAYS OF A LIGHT SOURCE

BACKGROUND OF THE INVENTION

1. Field of the Invention

This invention relates to apparatus for using the sun as a source of energy and more particularly to maintain a platform in a desired attitude with respect to rays of the sun used as a source of light energy.

2. Description of the Prior Art

It is known that electrical energy is usually derived from an energy source such as oil, a petroleum product. Recently, the cost of oil has been increasing because the availability of petroleum has been decreasing. The increasing cost of petroleum has caused extensive investigation of alternative sources of energy, such as the sun. Energy provided by the sun is referred to as solar energy.

Solar energy is usually converted into electrical energy by an array of solar cells carried upon a surface of a platform. The platform is mounted for rotation about first and second orthogonal axes substantially parallel to the earth's polar axis and to the platform surface, respectively. Because the first axis is parallel to the polar axis, the platform is referred to as being equatorially mounted.

The solar cells receive a maximum amount of solar energy when the rays of the sun are normal to the platform surface, thereby defining a desired attitude of the platform with respect to the rays of the sun. Therefore, during daylight it is desirable to maintain the desired attitude by moving the platform. During a day, the sun has an apparent position which undergoes major and minor components of change associated with a change of the time of day and a change of the time of year, respectively. Because the platform is equatorially mounted, the desired attitude is maintained by rotating the platform about the first axis in accordance with the major component of change and about the second axis in accordance with the minor component of change.

The platform rotates about the axes in response to signals from a photosensing unit comprised of four photocells of the type that provides a signal directly related to the quantity of received light. The photocells are arranged in two pairs disposed substantially along first and second orthogonal lines, respectively, on the surface. The first line is a projection of the first axis upon the surface; the second line is parallel to the second axis.

When the platform has the desired attitude, all of the photocells provide signals of substantially equal amplitude. In response to one of the pairs of the photocells providing a pair of signals of unequal amplitude, a motor rotates the platform about one of the axes in a direction that causes a reduction of the difference between the amplitudes of the signals, whereby the platform is substantially maintained in the desired attitude. By maintaining the platform in the desired attitude, the conversion of the solar energy has a minimized cost.

When the platform is located near a light reflecting object, reflected light may cause the platform to be in an undesired attitude where the solar cells do not receive the rays of the sun. It should be understood that light reflecting objects are commonplace in almost any environment where the platform is used. Additionally, in a hazy environment, the photocells may provide pairs of signals of equal amplitude when the platform is not in the desired attitude. The hazy environment is commonplace in many geographic areas. Accordingly, there is a need for a photosensing unit that maintains the platform in the desired attitude when the platform is located either near a light reflection object or in a hazy environment.

SUMMARY OF THE INVENTION

According to the present invention, an opaque open ended tubular member has its bottom disposed upon a surface of a platform whereon first and second orthogonal lines are defined, the first line being a projection of an axis of rotation of the platform. Within the tubular member is a lens that concentrates light substantially normal to the surface upon a pair of tracking photosensors that are carried on either side of the first line, respectively, along the second line. Outside of the tubular member a pair of acquisition photosensors are carried on either side of the first line, respectively, along the second line. In response to one of the pairs of photosensors providing signals of unequal amplitude, a transducer rotates the platform about the axis to cause a decrease in the difference between the amplitudes of the signals.

DESCRIPTION OF THE PREFERRED EMBODIMENT

In the preferred embodiment, two pairs of acquisition photocells provide signals that cause a platform to move close to a desired attitude with respect to rays of the sun. Additionally, rays of the sun substantially normal to the surface are concentrated by a lens upon two pairs of tracking photocells that cause the platform to substantially maintain the desired attitude.

Figure 1:
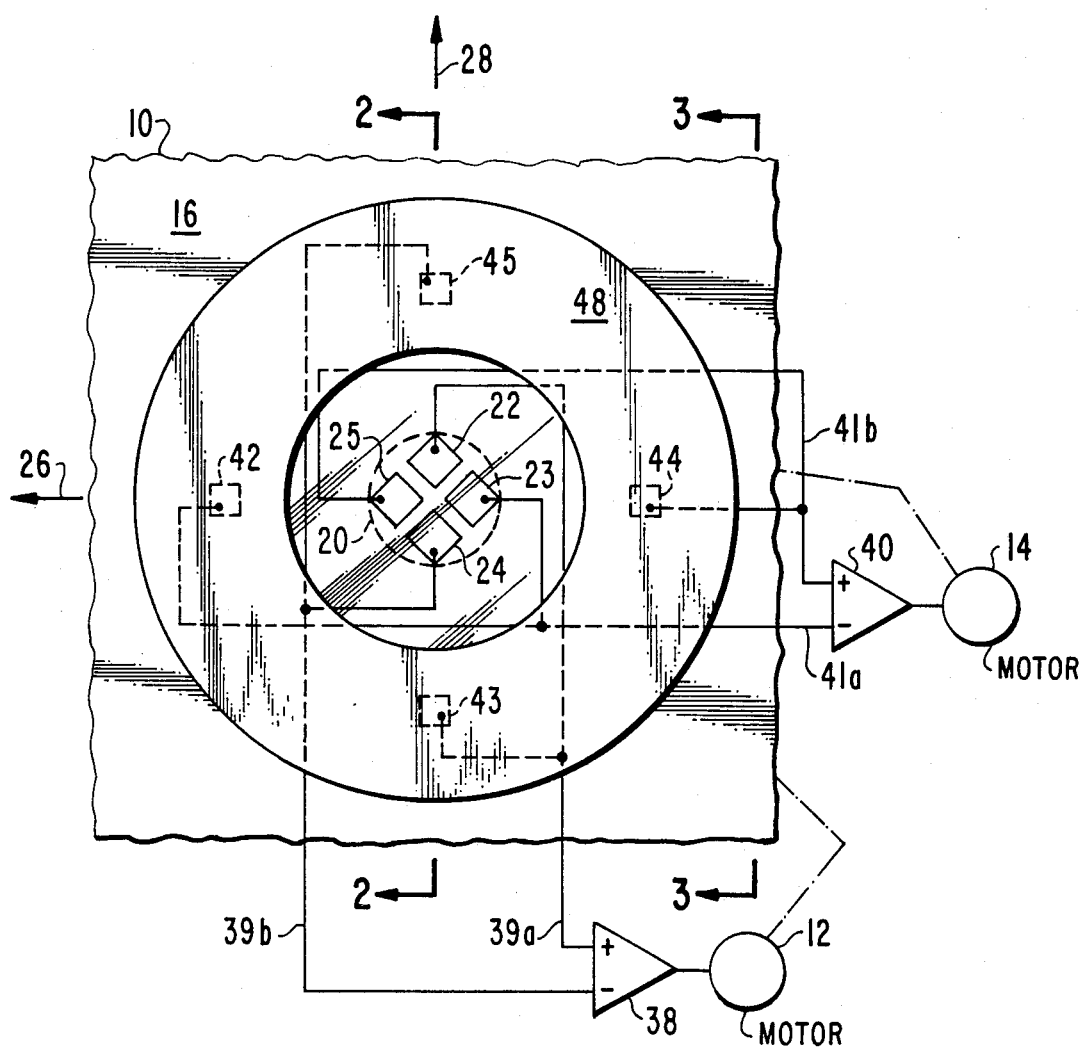
FIG. 1 is a plan view of an opaque cylinder and photosensors schematically coupled to motors in accordance with a preferred embodiment of the present invention.
Figure 2:
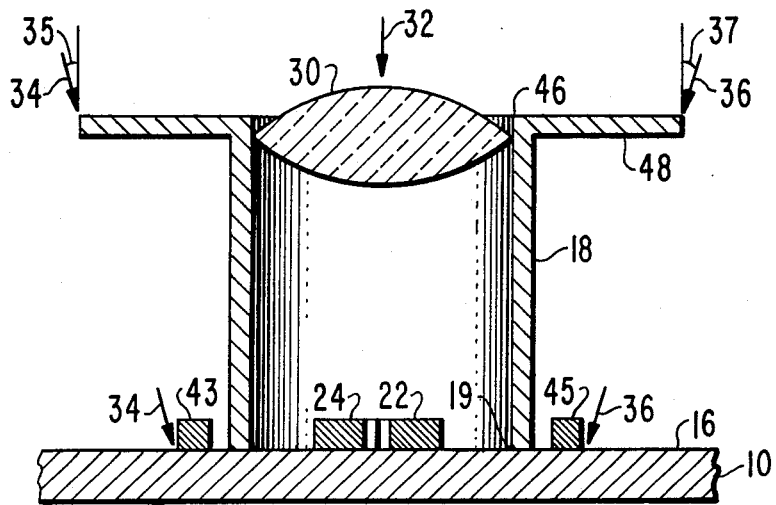
FIG. 2 is a section taken along the line 2—2 of FIG. 1.

Referring to FIGS. 1 and 2, a platform 10 is coupled to a motor 12 that is operable to rotate the platform 10 about a first axis which is parallel to the polar axis of the earth. The platform 10 is additionally coupled to a motor 14, similar to the motor 12, that is operable to rotate the platform 10 about a second axis that is parallel to a surface 16 of the platform 10 and orthogonal to the first axis. Accordingly, the platform 10 is equatorially mounted.

Carried upon the surface 16 are a multiplicity of solar cells (not shown) and an opaque open-ended cylindrical enclosure 18 that has an end 19 connected to the surface 16 with the axis of the cylinder 18 normal to the surface 16. The cylinder 18 encloses a tracking area 20 on the surface 16 that carries tracking photocells 22-25. The photocells 22-25 are of a type that provides a signal having an amplitude directly related to the intensity of received light. In this illustrative embodiment, the cylinder 18 has an inside diameter of 7.62 centimeters and a length of 7.62 centimeters. Additionally, the tracking area 20 is a circle having a diameter of 6 millimeters.

The photocells 23,25 are disposed in the area 20 along a first line 26, which is a projection of the first axis, on opposite sides of a second line 28 which is parallel to the second axis. Correspondingly, the photocells 22,24 are disposed along the line 28 on opposite sides of the line 26.

The direction normal to the surface 16 is indicated by an arrow 32. The platform 10 has the desired attitude when the sun has an apparent position which causes rays thereof to be in the direction of the arrow 32. As explained hereinafter, the photocells 22–25 cause the platform 10 to rotate about the first and second axes to substantially maintain the desired attitude.

Mounted within the cylinder 18 is a lens 30 having an optical axis which is coaxial with the axis of the cylinder 18. In this embodiment, the lens 30 is a double convex spherical lens with a 6.35 centimeter focal length. Additionally, the diameter of the lens 30 is 7.62 centimeters whereby the lens 30 fits within the cylinder 18.

When the rays of the sun are in the direction of the arrow 32, the lens 30 causes a concentrated illumination of the area 20 that equally illuminates all of the photocells 22–25. Therefore, the lens 30 is analogous to a high gain unidirectional antenna of a radio receiver.

When the rays of the sun are in the direction of an arrow 34, a small angle 35 is defined by the arrow 32 and the rays of the sun. Because the small angle 35 is defined, the lens 30 causes a partial illumination of the area 20, whereby only the photocell 22 is illuminated. In response to only the photocell 22 being illuminated, the amplitude of a first tracking signal provided by the photocell 22 is greater than the zero amplitude of a second tracking signal provided by the photocell 24.

Similarly, when the rays of the sun are in the direction of an arrow 36, a small angle 37 is defined by the arrow 32 and the rays of the sun. Because the small angle 37 is defined, the lens 30 causes a partial illumination of the area 20 whereby only the photocell 24 is illuminated. In response to only the photocell 24 being illuminated, the amplitude of the second tracking signal is greater than the zero amplitude of the first tracking signal.

The photocells 22,24 are connected to non-inverting and inverting inputs of a differential amplifier 38 through signals lines 39a, 39b, respectively. The amplifier 38 has an output connected to an input line of the motor 12, whereby the photocells 22,24 are coupled to the motor 12 through the amplifier 38.

In response to the amplitude of the first tracking signal being greater than the amplitude of the second tracking signal, the amplifier 38 provides a motor drive signal of a positive polarity. The positive polarity of the motor drive signal causes the shaft of the motor 12 to rotate the platform 10 about the first axis in a forward direction that reduces the difference between the amplitudes of the first and second tracking signals. Correspondingly, in response to the amplitude of the second tracking signal being greater than the amplitude of the first tracking signal, the motor drive signal is of a negative polarity which causes the motor 12 to rotate the platform 10 in a reverse direction, whereby the difference between the amplitudes of the first and second tracking signals is reduced. Therefore, in response to the tracking signals, the motor 12 rotates the platform 10 to reduce the difference between the amplitude of the first and second tracking signals.

In a manner similar to that described hereinbefore, the photocells 23,25 are connected to non-inverting and inverting inputs of a differential amplifier 40, similar to the amplifier 38, through signal lines 41a, 41b, respectively. Therefore, the motor 14 rotates the platform 10 about the second axis to reduce the difference between amplitudes of tracking signals provided by the photocells 22,24. Hence, the motors 12,14 rotate the platform 10 to substantially maintain the desired attitude.

It should be understood that when the rays of the sun define a large angle with the arrow 32, the tracking area 20 is not illuminated, whereby the tracking signals are not usuable for maintaining the desired attitude.

Because the tracking signals are not usable when a large angle is defined, the photosensing unit additionally includes acquisition photocells 42–45 that are carried upon the surface 16 on the outside of the cylinder 18. The photocells 42,44 are disposed along the line 26 adjacent to the cylinder 18 on opposite sides of the line 28. The photocells 43,45 are disposed along the line 28 adjacent to the cylinder 18 on opposite sides of the line 26.

As explained hereinafter, when a large angle is defined, the rotation of the platform 10 is in response to acquisition signals provided by the photocells 42–45. However, when the arrow 32 and the rays of the sun define a small angle, the photocells 42–45 are shielded from the rays of the sun.

Figure 3:
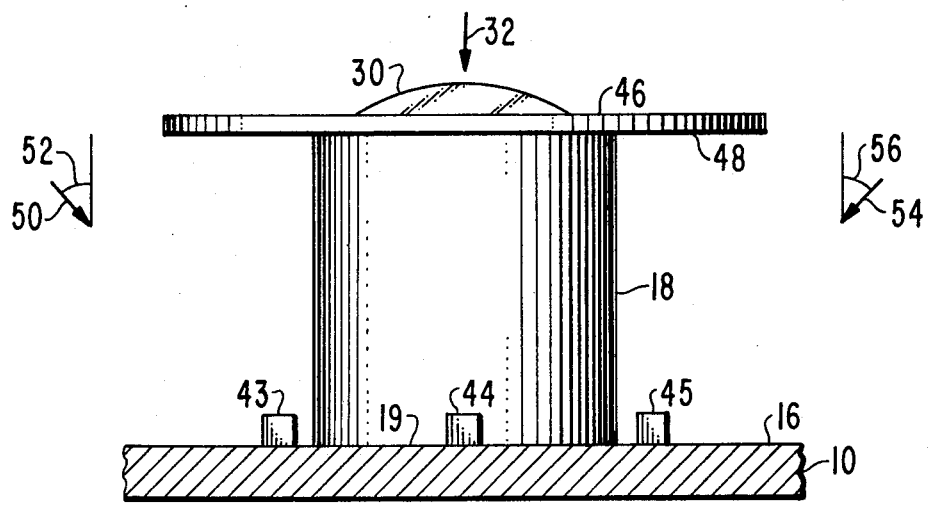
FIG. 3 is a section taken along the line 3—3 of FIG. 1.

Referring to FIG. 3, the cylinder 18 has an end 46 that is integral with a flange 48. Since the photocells 42–45 are disposed adjacent to the cylinder 18, the flange 48 shields the photocells 42–45 from rays of the sun when a small angle is defined. However, when the rays of the sun are in the direction of an arrow 50 at a large angle 52 with the arrow 32, the opacity of the cylinder 18 prevents rays of the sun from being transmitted to the photocell 45, whereby only the photocell 43 is illuminated. In response to only the photocell 43 being illuminated, the amplitude of a first acquisition signal provided by the photocell 43 is greater than the amplitude of a second acquisition signal provided by the photocell 45.

Similarly, when the rays of the sun are in the direction of an arrow 54, a large angle 56 is defined and the opacity of the cylinder 18 prevents rays of the sun from being transmitted to the photocell 43, whereby only the photocell 45 is illuminated. In response to only the photocell 45 being illuminated, the amplitude of the second acquisition signal is greater than the amplitude of the first acquisition signal.

The photocells 43,45 are connected to the amplifier 38 at the inverting and non-inverting inputs thereof and to the photocells 22,24 through the lines 39a, 39b, respectively (FIG. 1). In this embodiment, all the photocells 22–25 and all the photocells 42–45 are diode photocells. Therefore, when the first acquisition signal (from the photocell 43) has an amplitude greater than the amplitude of the first tracking signal, for example, the photocell 22 is reverse biased and the inverting input of the amplifier 38 receives the first acquisition signal. In a similar manner, the photocells 22–25 and the photocells 42,44,45 may be reverse biased. Accordingly, the first and second acquisition signals may cause a rotation of the platform 10 about the first axis that is analogous to a rotation caused by the tracking signals.

It should be understood that after the rays of the sun are at the angle 52 with the arrow 32, the motor 12 rotates the platform 10 in response to the first and second acquisition signals thereby causing a transition interval when the defined angle changes from a large angle to a small angle. During the transition interval as the flange 48 shields the photocell 22 is illuminated and further rotation of the platform 10 is in response to the first and second tracking signals as described hereinbefore. There is a corresponding transition interval after the rays of the sun are at an angle 56 with the arrow 32.

In a manner similar to that described hereinbefore, the photocells 42,44 are connected to the amplifier 40 at the inverting and non-inverting inputs thereof through the lines 41a, 41b, respectively. Therefore, the motor 14 rotates the platform 10 about the first axis to reduce the difference between amplitudes of signals provided by the photocells 42,44. Hence, the motors 12,14 rotate the platform 10 in a direction which reduces a large angle defined by the rays of the sun and the arrow 32.

Thus there is described hereinbefore apparatus for positioning a platform in a desired attitude with respect to rays of the sun. A group of acquisition photosensors provide signals for rotating the platform close to the desired attitude; the desired attitude is substantially maintained in response to signals from a group of tracking photosensors whereon a lens concentrates rays of the sun. Since the lens is analogous to a unidirectional antenna, the concentrated rays are intense relative to either rays of the sun in a hazy environment or light from a light reflecting object. Because of the relative intensity of the concentrated rays, the platform is not rotated from the desired attitude in either the hazy environment or in response to light from the light reflecting object.

What is claimed is:

1. Apparatus for maintaining a platform in a desired attitude with respect to rays from a source of light energy, comprising:
    an opaque, open-ended, tubular member having a bottom disposed upon a surface of said platform to enclose a tracking area thereon where a first imaginary line is a projection of an axis of rotation of said platform and a second imaginary line is substantially orthogonal to said first line;
    a lens mounted within said member to concentrate upon said tracking area rays of the light energy substantially normal to said surface;
    a pair of first tracking sensors carried by said tracking area on opposite sides of said first line and along said second line, each first tracking sensor providing a first tracking signal having an amplitude in direct relation to the quantity of received light;
    a pair of first acquisition sensors, carried by said surface outside of said tubular member along said second line on opposite sides of said first line, each first acquisition sensor providing a first acquisition signal having an amplitude in direct relation to the quantity of received light; and
    a transducer coupled to said first sensors for rotating said platform about said axis in response to a difference between said first tracking signals and in response to a difference between said first acquisition signals.

2. Apparatus according to claim 1 wherein said tubular member is a hollow cylinder with its axis normal to said surface, said cylinder having a flanged top that shields said acquisition sensors from said source when rays thereof are parallel to the axis of said cylinder.

3. Apparatus according to claim 1, and in addition:
    a pair of second tracking sensors carried by said tracking area on opposite sides of said second line and along said first line, each second tracking sensor providing a second tracking signal in direct relation to the quantity of received light;
    a pair of second acquisition sensors carried by said surface outside of said tubular member along said first line on opposite sides of said second line, each second acquisition sensor providing a second acquisition signal having an amplitude in direct relation to the quantity of received light; and
    a transducer coupled to said second sensors for rotating said platform about an axis parallel to said second line in response to a difference between said second tracking signals and in response to a difference between said second acquisition signals.

4. Apparatus according to claim 1 wherein said transducer comprises:
    a differential amplifier having inverting and non-inverting input terminals connected to sensors on one side of said first line and the other side of said first line, respectively; and
    a motor operable to rotate said platform about said first axis, the input of said motor being connected to the output of said amplifier.

5. Apparatus according to claim 4 wherein said sensors are diode photocells.